Sept. 30, 1924.  V. YNGVE  1,510,127

DRY CELL

Filed Nov. 14, 1923

INVENTOR
Victor Yngve
BY
his ATTORNEY

Patented Sept. 30, 1924.

1,510,127

UNITED STATES PATENT OFFICE.

VICTOR YNGVE, OF SOUTH ORANGE, NEW JERSEY, ASSIGNOR TO MANHATTAN ELECTRICAL SUPPLY COMPANY, INC., OF NEW YORK, N. Y., A CORPORATION OF MASSACHUSETTS.

DRY CELL.

Application filed November 14, 1923. Serial No. 674,610.

*To all whom it may concern:*

Be it known that I, VICTOR YNGVE, a citizen of the United States, residing at South Orange, New Jersey, in the county of Essex and State of New Jersey, United States of America, have invented certain new and useful Improvements in Dry Cells, do hereby declare that the following is a full, clear, and exact description of the same.

This invention relates to dry cells and more particularly to improvements in the assembly of dry cells.

The object of the present invention is to provide certain improvements in the type of dry cell disclosed in a copending application of William F. Hendry, Serial No. 654,611; filed July 30, 1923, in which the depolarizing mixture is compacted in the form of washers or tablets with an aperture in the washer through which the centrally located carbon electrode projects. One of the important requirements in the assembly of such cells is that the washers make good contact with the carbon electrode. For this purpose, in accordance with the present invention, the carbon electrode is provided with an uneven, or corrugated surface which cooperates with correspondingly corrugated openings in the washers. Due to this unevenness the surface at which the washers and the carbon electrode contact is substantially larger and the probability of a good contact being established between the washers and the carbon electrode is materially increased. Preferably, the opening in the washers is made slightly smaller in diameter than the diameter of the carbon electrode insuring thus a tight fit.

The invention will be more fully understood from the following detailed description and the appended claims.

Figure 1:
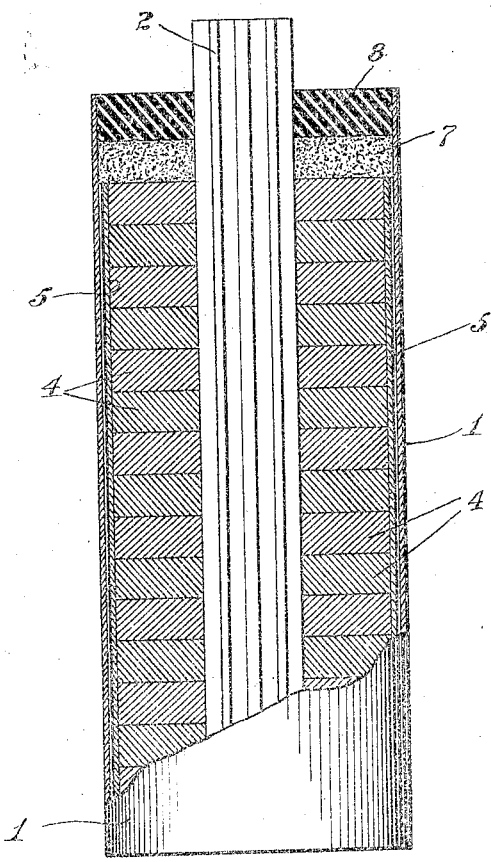
Figure 2:
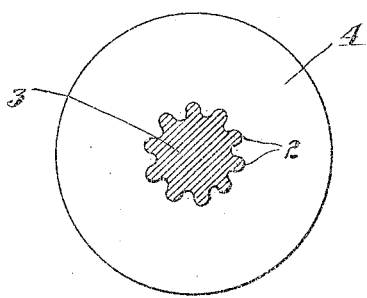

The drawings illustrate an embodiment of the present invention, Fig. 1 being a cross section of a dry cell and Fig. 2 a top view of one of the washers.

1 is the zinc cup within which a fluted carbon electrode 2 is centrally provided, said carbon electrode projecting through openings 3 provided in washers 4 that are piled one on top of the other within the zinc container. These washers are compacted of some suitable depolarizing mixture and are surrounded by a cellulose container 5 preferably coated with paste. However, instead of the bag 5, the washers 4 may be surrounded by paper coated with a suitable paste. The battery is sealed by means of a layer of sand 7 and a layer of pitch 8.

Obviously, instead of the straight grooves, the grooves on carbon pencil 2 may be provided in a spiral or other form.

What I claim is:

1. In a dry cell, a plurality of tablets compacted of depolarizing mixture, apertures through said tablets having a corrugated outline, and a corrugated carbon electrode projecting through the apertures of said tablets.

2. In a dry cell, a plurality of tablets compacted of depolarizing mixture, apertures in said tablets having vertical flutings, and a vertically fluted carbon pencil projecting through said apertures.

3. In a dry cell, a plurality of tablets compacted of depolarizing mixture, fluted apertures through said tablets, and a correspondingly fluted carbon electrode having a diameter larger than said apertures cooperating therewith.

In witness whereof, I hereunto subscribe my name this 9th day of November, 1923.

VICTOR YNGVE.